United States Patent
Guo et al.

(10) Patent No.: US 12,384,562 B2
(45) Date of Patent: Aug. 12, 2025

(54) SYSTEM AND METHOD FOR CAPTURING SPACE TARGET

(71) Applicant: Harbin Institute of Technology, Harbin (CN)

(72) Inventors: Jinsheng Guo, Harbin (CN); Fan Wu, Harbin (CN); Shi Qiu, Harbin (CN); Jian Chen, Harbin (CN); Cheng Wei, Harbin (CN); Hongxu Wang, Harbin (CN)

(73) Assignee: Harbin Institute of Technology, Harbin (CN)

( * ) Notice: Subject to any disclaimer, the term of this patent is extended or adjusted under 35 U.S.C. 154(b) by 56 days.

(21) Appl. No.: 18/390,259

(22) Filed: Dec. 20, 2023

(65) Prior Publication Data

US 2024/0116655 A1   Apr. 11, 2024

Related U.S. Application Data

(63) Continuation of application No. PCT/CN2023/081155, filed on Mar. 13, 2023.

(30) Foreign Application Priority Data

Mar. 24, 2022   (CN) .......................... 202210302809.4

(51) Int. Cl.
    *B64G 1/10*       (2006.01)
(52) U.S. Cl.
    CPC .................................. *B64G 1/1081* (2023.08)
(58) Field of Classification Search
    CPC ..... B64G 1/1081; B64G 1/1078; B64G 1/222
    See application file for complete search history.

(56) References Cited

U.S. PATENT DOCUMENTS

| | | |
|---|---|---|
| 6,789,536 B1 | 9/2004 | Summers |
| 2002/0079407 A1 | 6/2002 | Lounge et al. |
| 2014/0367523 A1* | 12/2014 | Kitazawa ............. B64G 1/6462 244/158.4 |

FOREIGN PATENT DOCUMENTS

| | | |
|---|---|---|
| CN | 102991731 A | 3/2013 |
| CN | 103072142 A | 5/2013 |

(Continued)

OTHER PUBLICATIONS

First Office Action issued in counterpart Chinese Patent Application No. 202210302809.4, dated Nov. 23, 2023.
(Continued)

*Primary Examiner* — Kimberly S Berona
*Assistant Examiner* — Nevena Aleksic
(74) *Attorney, Agent, or Firm* — Westbridge IP LLC

(57) ABSTRACT

Disclosed are a system and a method for capturing a space target. The system includes a plurality of capturing devices, a delivery device, a launching device, and a deceleration and recovery device, each of the plurality of capturing devices is configured to be launched into a target orbit to capture a defunct space target, the delivery device is configured to deliver, along a preset delivery trajectory, each of the plurality of capturing devices to a first preset location in the launching device, the launching device is configured to launch each of the plurality of capturing devices located at the first preset location into the target orbit to capture the defunct space target, and the deceleration and recovery device is configured to decelerate each of the plurality of capturing devices after it is launched and flies a preset distance.

14 Claims, 13 Drawing Sheets

(56) References Cited

FOREIGN PATENT DOCUMENTS

| | | |
|---|---|---|
| CN | 103863583 A | 6/2014 |
| CN | 109353550 A | 2/2019 |
| CN | 109969433 A | 7/2019 |
| CN | 110435927 A | 11/2019 |
| CN | 110450989 A | 11/2019 |
| CN | 112455731 A | 3/2021 |
| CN | 113895662 A | 1/2022 |
| CN | 114674179 A | 6/2022 |
| JP | 2014210572 A | 11/2014 |

OTHER PUBLICATIONS

International Search Report and Written Opinion issued in corresponding PCT Application No. PCT/CN2023/081155, dated May 29, 2023.

\* cited by examiner

US 12,384,562 B2

SYSTEM AND METHOD FOR CAPTURING SPACE TARGET

CROSS-REFERENCE TO RELATED APPLICATIONS

The present application is a continuation of International Patent Application No. PCT/CN2023/081155, filed on Mar. 13, 2023, which claims priority to Chinese Patent Application No. 202210302809.4, filed on Mar. 24, 2022. The disclosures of these applications are hereby incorporated by reference in their entireties.

TECHNICAL FIELD

The present application relates to the technical field of aerospace, and particularly to a system and a method for capturing a space target.

BACKGROUND

With the rapid increase in the number of space crafts in space orbit, the number of defunct space crafts in space orbit has also surged. It is urgent to capture and remove these defunct space crafts in the field of aerospace. The defunct space crafts in space orbit may be captured by space webs, a space robotic arm, or a space harpoon. Moreover, the defunct space crafts in space orbit may be captured through rendezvous and docking (RVD) with a tracking spacecraft. When the defunct space crafts are captured by the space webs, an onboard spacecraft can only carry a limited number of the space webs and thus the capturing efficiency is relatively low. When the defunct space crafts are captured by the space robotic arm, the space robotic arm has a large mass and thus the onboard spacecraft needs a large overload, and the cost of the space robotic arm is also significant. Moreover, when the defunct space crafts are captured by the space robotic arm, orbit control may be performed in a high precision and the reliability of the onboard spacecraft may be affected by the reliability of the space robotic arm. Due to strict technical requirements, it is difficult to capture the defunct space crafts in space orbit through rendezvous and docking (RVD) with the tracking spacecraft. Although it is simple and reliable to capture the defunct space crafts by the space harpoons, lightweight design of the space harpoons may be considered. The space harpoons may be prevented to rebound and damage the onboard spacecraft. Multiple of the space harpoons may be prevented to repeatedly capture the same defunct spacecraft.

SUMMARY

The disclosure provides a system and a method for capturing a space target. According to the system and method, defunct space targets are captured and then towed to a decay orbit with low capturing cost and high capturing efficiency.

The technical solution of the disclosure is implemented as follows.

According to a first aspect of the disclosure, a system for capturing a space target is provided. The system includes a plurality of capturing devices, a delivery device, a launching device, and a deceleration and recovery device.

Each of the plurality of capturing devices is configured to be launched into a target orbit to capture a defunct space target.

The delivery device is configured to deliver, along a preset delivery trajectory, each of the plurality of capturing devices to a first preset location in the launching device.

The launching device is configured to launch each of the plurality of capturing devices located at the first preset location into the target orbit to capture the defunct space target.

The deceleration and recovery device is configured to decelerate each of the plurality of capturing devices after it is launched and flies a preset distance.

According to a second aspect of the disclosure, a method for capturing a space target is provided. The method may be applied to the system according to the first aspect. The method includes the followings operations:

delivering, by the delivery device, along a preset delivery trajectory, each of the plurality of capturing devices to the first preset location in the launching device;

launching, by the launching device, each of the plurality of capturing devices located at the first preset location into the target orbit to capture the defunct space target; and decelerating, by the deceleration and recovery device, each of the plurality of capturing devices after it is launched and flies a preset distance.

According to the disclosure, a system and a method for capturing a space target is provided. The delivery device delivers the plurality of capturing devices to the first preset location in the launching device along the preset delivery trajectory. The launching device may launch the capturing device located at the first preset location to capture the defunct space target. After the capturing device is launched and flies the preset distance, the deceleration and recovery device decelerates the capturing device and prevents the capturing device from rebounding to cause damage to an onboard spacecraft. The system according to the disclosure may capture the defunct space targets of different sizes and types, including the defunct space targets that are difficult to capture using traditional space robotic arm or space-webs. The system according to the disclosure has strong adaptability and high capturing efficiency.

BRIEF DESCRIPTION OF THE DRAWINGS

To better explain the disclosure, the figures referred in the description of the disclosure will be briefly introduced. The figures in the following description are only examples of the disclosure.

DETAILED DESCRIPTION OF THE EMBODIMENTS

To make the objectives, technical solutions, and advantages of the disclosure more apparent, the following will describe in detail the example embodiments according to the disclosure, with reference to the accompanying drawings. Obviously, the described embodiments are just part of the embodiments of the disclosure, not all of the embodiments. It should be understood that the disclosure is not limited by the example embodiments described here.

Figure 1:
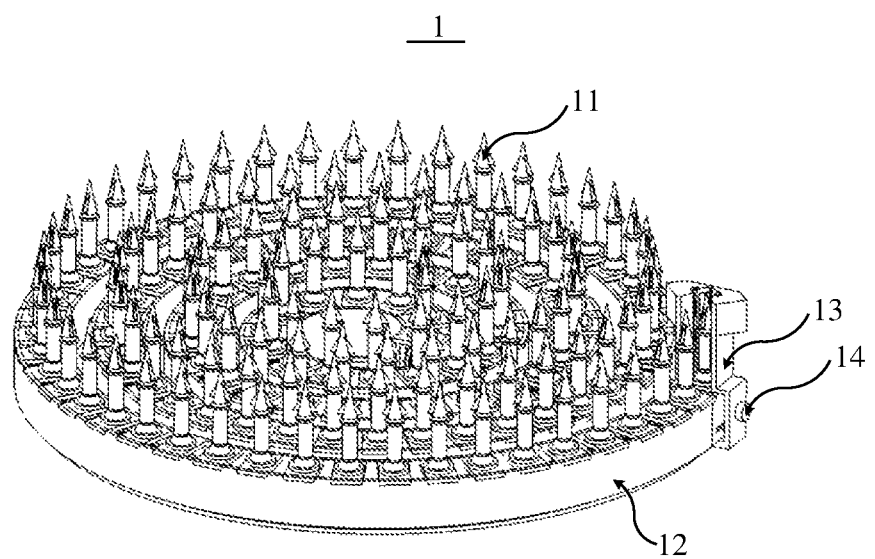
FIG. 1 is a diagram of the structure of a system for capturing a space target according to the disclosure.

FIG. 1 is a diagram of a structure of a system 1 for capturing a space target according to the disclosure. The system 1 includes a plurality of capturing devices 11, a delivery device 12, a launching device 13, and a deceleration and recovery device 14.

Each of the plurality of capturing devices 11 is configured to be launched into a target orbit to capture a defunct space target.

The delivery device 12 is configured to deliver each of the plurality of capturing devices 11 to a first preset location in the launching device 13 along a preset delivery trajectory.

The launching device 13 is configured to launch each of the plurality of capturing devices 11 located at the first preset location into the target orbit to capture the defunct space target.

The deceleration and recovery device 14 is configured to decelerate each of the plurality of the capturing devices 11 after it is launched and flies a preset distance.

In an embodiment of the disclosure, the defunct space targets are not limited to the defunct space crafts, but also include space debris.

Figure 2:
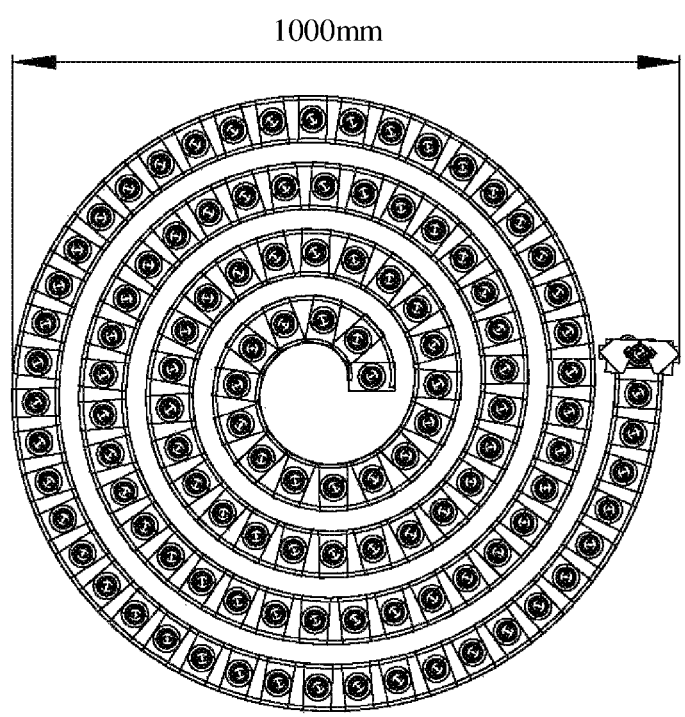
FIG. 2 is atop view of the structure of the system for capturing the space target according to the disclosure.

Moreover, the shape of the preset delivery trajectory is not limited to a coiled shape shown in FIGS. 1 and 2. Other forms or shapes of the delivery trajectories may also be applied to the system 1 of the disclosure.

For the system 1 shown in FIG. 1, the delivery device 12 delivers the plurality of capturing devices 11 to the first preset location in the launching device 13 along the preset delivery trajectory. The launching device 13 may launch the capturing device 11 located at the first preset location to capture the defunct space target. After the capturing device 11 is launched and flies the preset distance, the deceleration and recovery device 14 decelerates the capturing device 11 and prevents the capturing device 11 from rebounding to cause damage to an onboard spacecraft. The system 1 according to the disclosure may capture the defunct space targets of different sizes and types, including the defunct space targets that are difficult to capture using traditional space robotic arm or space-webs. The system 1 according to the disclosure has strong adaptability and high capturing efficiency.

The components of the capturing devices 11 are made of a biodegradable material. Therefore, in the case that the capturing devices 11 and the defunct space targets are towed into the predetermined decay orbit, the capturing devices 11 can be fully degraded.

In an embodiment of the disclosure, the system 1 shown in FIG. 1 may be mounted on the surface of other space crafts (not shown in FIG. 1), such as a satellite, and thus the system 1 may fly into a predetermined space orbit by mounting on the satellite and execute a capturing task.

When the capturing device 11 hits the defunct space target, the defunct space target travels with the onboard spacecraft to the predetermined decay orbit. The capturing task of towing the defunct space target from an initial space orbit to the predetermined decay orbit is accomplished.

The system 1 shown in FIG. 1 can carry 200 capturing devices 11 to execute 200 capturing tasks, which saves launching cost by avoiding repeatedly launching the system 1 from a ground station. Moreover, the system 1 in an embodiment of the disclosure may fly into the space orbit by mounting on the satellite weighing up to 300 kilograms to execute the capturing tasks in space orbit with low capturing cost and high capturing efficiency. According to another embodiment of the disclosure, the number of the capturing device 11 may be adjusted according to the actual requirements, and the number of the capturing device is not limited to 200.

Figure 3:
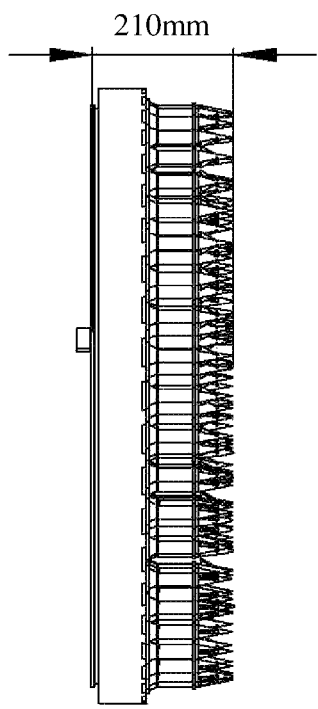
FIG. 3 is a side view of the structure of the system for capturing the space target according to the disclosure.

When the assembly of the system 1 is completed, as shown in FIGS. 2 and 3, the maximum radial diameter of the system 1 does not exceed 1000 millimeters, and maximum height of the system 1 does not exceed 210 millimeters. Hence, the system 1 is small in size and light in mass, realizing a lightweight design.

For the system 1 shown in FIG. 1, in some possible implementations, the deceleration and recovery device 14 is further configured to recover the capturing device 11 into the launching device 13 when the capturing device 11 fails to hit the defunct space target. When the capturing device 11 does not hit the defunct space target, the capturing device 11 may be decelerated and recovered into the launching device 13 by the deceleration and recovery device 14. The capturing device 11 is re-launched to another target orbit to continue capturing other defunct space target.

Figure 4:
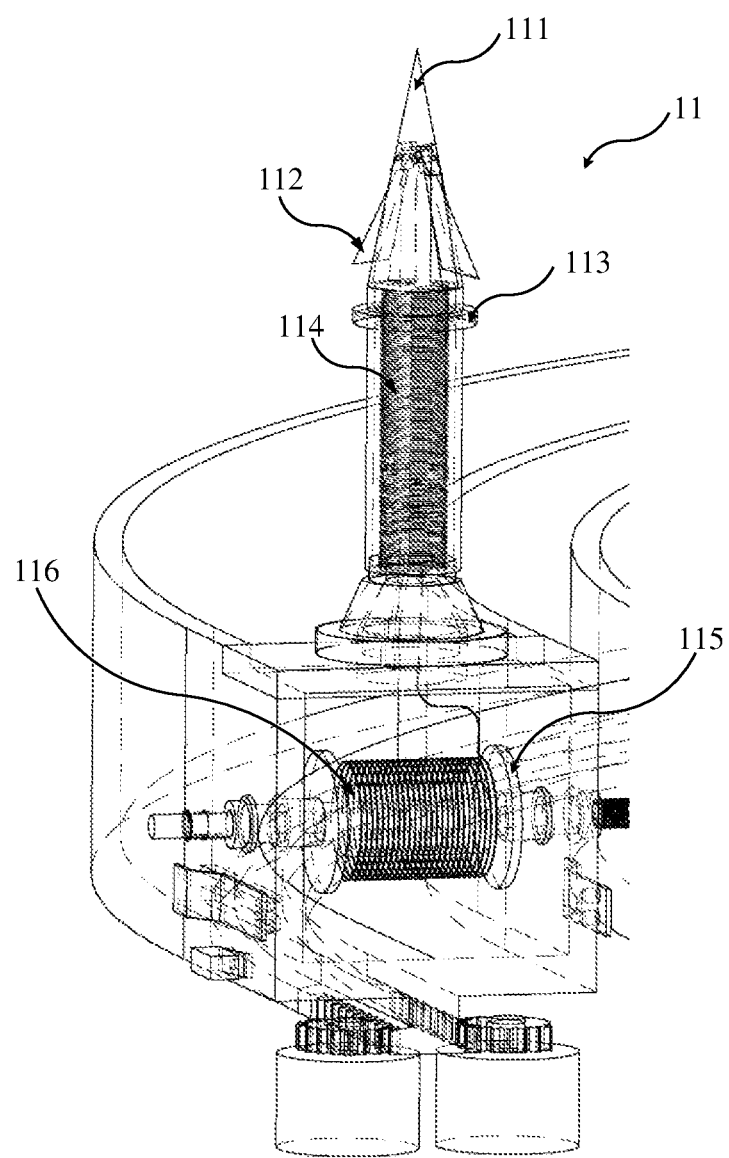
FIG. 4 is a diagram of the structure of a capturing device according to the disclosure.

For the system 1 shown in FIG. 1, in some possible implementations, as shown in FIG. 4, each of the capturing devices 11 includes a head 111, at least one barb unit 112, a location unit 113, a first rope 114 wound inside of the capturing device 11, a deceleration shaft 115, and a second rope 116 wound on the deceleration shaft 115.

The head 111 is pointed for piercing and inserting into the defunct space target.

The barb unit 112 is configured to prevent the defunct space target from falling off when the defunct space target is towed.

The location unit 113 is configured to acquire real-time location of the capturing device 11 to assist the capturing device 11 in moving to the first preset location.

The second rope 116 is connected to the first rope 114, and the second rope 116 decelerates the capturing device 11 to zero by gradually unwinding from the deceleration shaft 115 when the first rope 114 is fully unwounded.

In the specific implementation process, the components of the capturing device 11, for example, the head 111, the barb unit 112, and the location unit 113, can be detached from the system 1 and all be launched into the target orbit. In addition, when the capturing device 11 has been launched, the first rope 114 can gradually leave from the capturing device 11 and gradually unwounded. When the capturing device 11 hits the defunct space target before the first rope 114 is fully unwounded, the capturing device 11 will continue driving the first rope 114 to fly forward until the first rope 114 is fully unwounded. When the first rope 114 is fully unwounded, the first rope 114 will pull the second rope 116 to gradually unwound to decelerate the capturing device 11. Naturally, when the first rope 114 is fully unwounded and the capturing device 11 has not captured the defunct space target, the first rope 114 can also pull the second rope 116 to gradually unwound to decelerate the capturing device 11. The first rope 114 and the second rope 116 may be the same rope, which are designed in segments. The first rope 114 is wound within the capturing device 11, and the second rope 116 is wound on the deceleration shaft 115. Such a design not only helps the capturing device 11 capture the defunct space target but also effectively decelerates the capturing device 11 to prevent the capturing device 11 from rebounding and damaging the onboard satellite.

According to an embodiment of the disclosure, each of the capturing devices 11 has a weight of 0.5 kilograms, which is beneficial for the lightweight design of the system 1. The length of the first rope 114 being 50 meters indicates that the system 1 can capture the defunct space target at a distance of 50 meters. Additionally, the length of the first rope 114 also determines the preset distance that the capturing device 11 can fly mentioned in the technical scheme.

Figure 5:
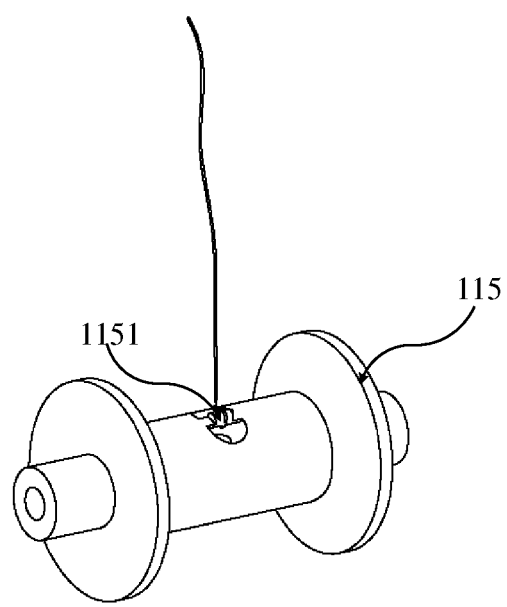
FIG. 5 is a diagram of the structure of a deceleration axis with an internal heating device according to the disclosure.

In some examples, as shown in FIG. 5, a heating device 1151 is installed inside the deceleration shaft 115, and the heating device 1151 is configured to heat the second rope 116 to fuse the second rope 116 when the defunct space target has been towed to the predetermined decay orbit. The heating device 1151 may be a power resistor.

Figure 6:
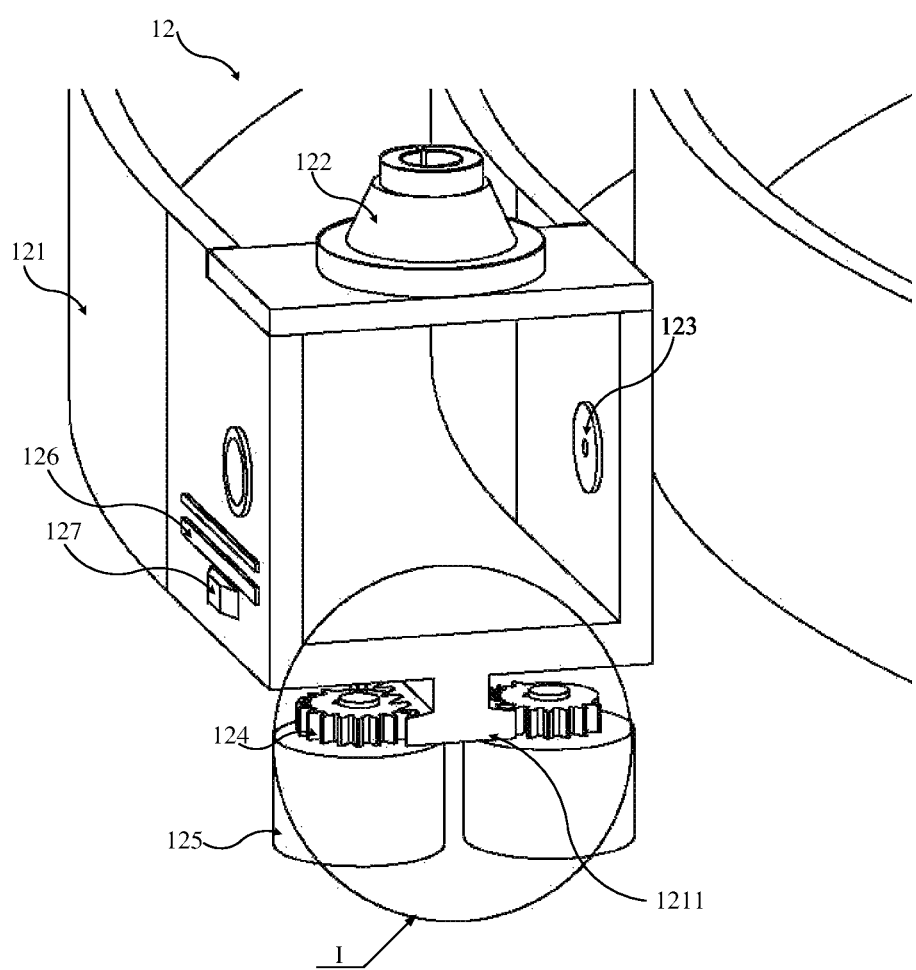
FIG. 6 is a diagram of the structure of a delivery device according to the disclosure.

For the system 1 shown in FIG. 1, in some possible implementations, as shown in FIG. 6, the delivery device 12 includes a first frame 121, a plurality of mounting brackets 122, a plurality pairs of deceleration shaft holes 123, a first transmission gear 124, a first driving mechanism 125 connected to the first transmission gear 124, a plurality of power contacts 126, and a plurality of switch contacts 127.

The plurality of mounting brackets 122 are uniformly set on the upper side of the first frame 121, and each of the capturing devices 11 is mounted on the corresponding mounting bracket 122.

The plurality pairs of deceleration shaft holes 123 are uniformly formed in the first frame 121 in a manner that each pair of deceleration shaft holes 123 are arranged on two lateral sides of the first frame 121, and the deceleration shaft 115 is rotatably installed within the corresponding pair of deceleration shaft holes 123.

Figure 7:
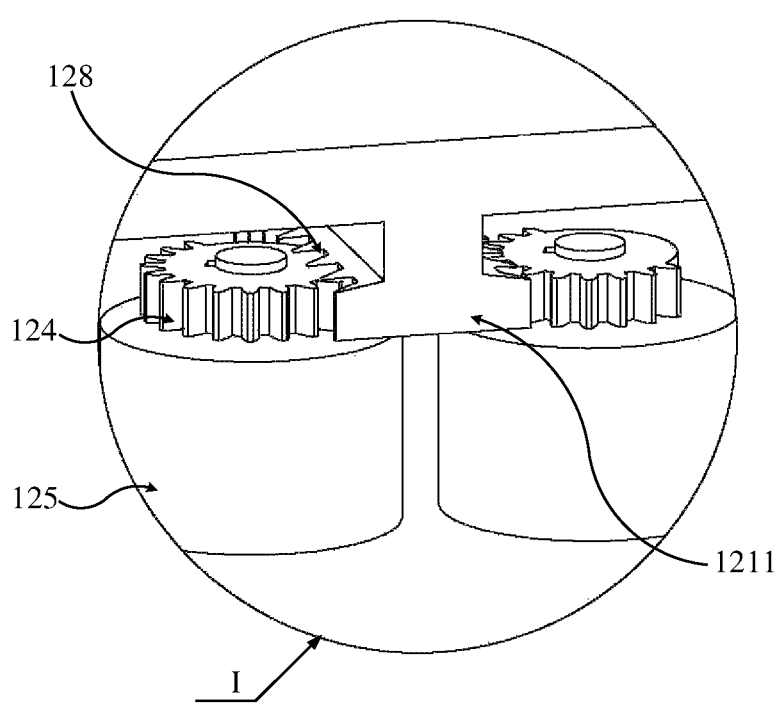
FIG. 7 is a partial enlarged diagram of part I shown in FIG. 6.

A bottom of the first frame 121 has an inverted T-shaped guide rail 1211, as shown in FIG. 7, and both transverse ends of the T-shaped guide rail 1211 are respectively provided with a first transmission rack 128 engaging with the first transmission gear 124.

The first driving mechanism 125 is configured to rotate the first transmission gear 124 to translate the first transmission rack 128, so that the plurality of capturing devices 11 may move along the preset delivery trajectory.

The plurality of power contacts 126 are uniformly arranged on both sides of the first frame 121, and the plurality of power contacts 126 provide electrical energy during the launching and deceleration and recovery process of the capturing device 11.

The plurality of switch contacts 127 are uniformly arranged on one side of the first frame 121.

In the detailed implementation process, the first driving mechanism 125 drives the first transmission gear 124 to engage with the first transmission rack 128, thereby enabling the plurality of capturing devices 11 to sequentially advance until arriving at the first preset location in the launching device 13. During the advancing movement of the capturing device 11, the first driving mechanism 125 and the first transmission gear 124 remain stationary. The first frame 121 and other components mounted on the first frame 121, such as the mounting bracket 122, the deceleration shaft hole 123, the power contact 126, and the switch contact 127, will move with the capturing device 11. Additionally, the delivery device 12 is assembled in conjunction with the onboard satellite by the T-shaped guide rail 1211.

According to an embodiment of the disclosure, the delivery device 12 includes a plurality of transmission units. Each of the transmission units includes a mounting bracket 122, two deceleration shaft holes 123 for installing the deceleration shaft 115, two power contacts 126, and a switch contact 127. Each capturing device 11 corresponds to a transmission unit. During transmission process, each transmission unit moves with the corresponding capturing device 11, cooperating to complete the launching tasks, decelerating and recovering the capturing device 11.

On the one hand, the first driving mechanism 125 is a stepper motor.

On the other hand, the transmission path of the capturing device 11 depends on the shape of the first frame 121, such as the coiled shape shown in FIG. 1.

Figure 8:
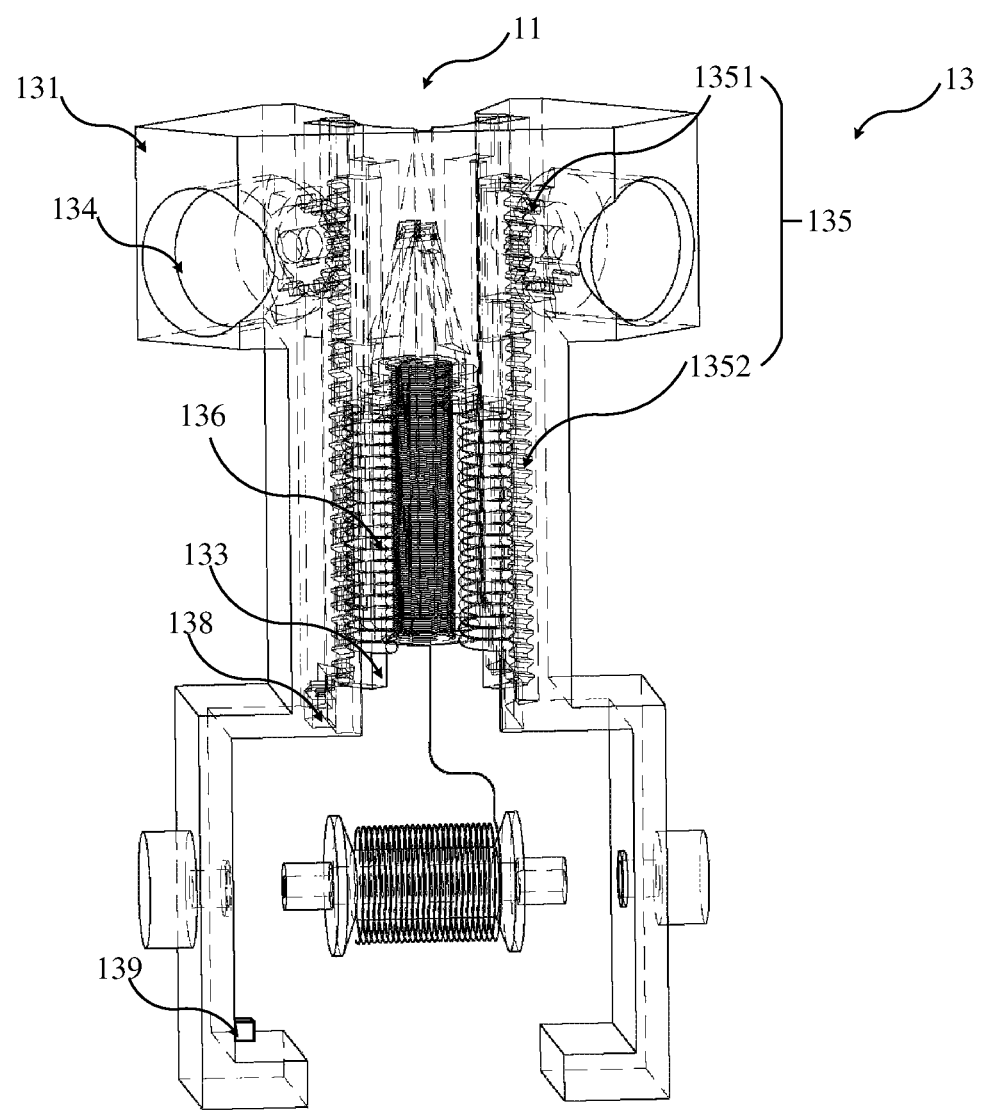
FIG. 8 is a diagram of the structure of a launching device according to the disclosure.
Figure 9:
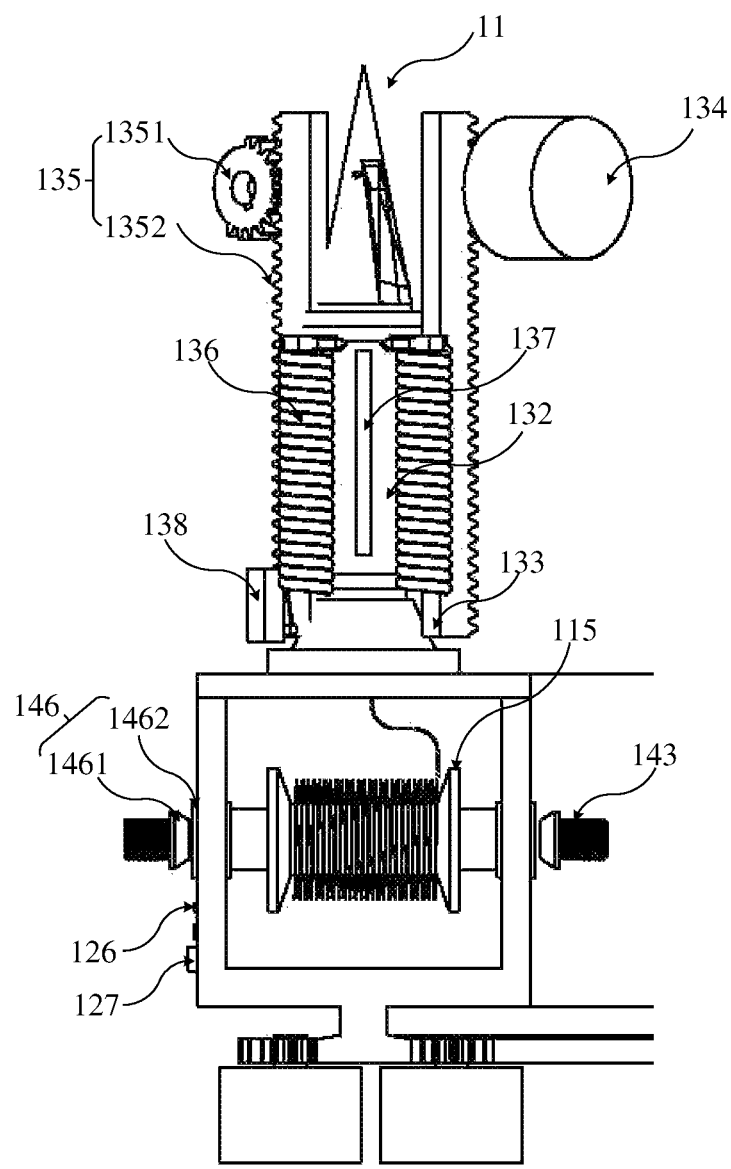
FIG. 9 is a diagram of the internal structure of the launching device according to the disclosure.

For the system 1 shown in FIG. 1, in some possible implementations as shown in FIGS. 8 and 9, the launching device 13 includes a second frame 131, a launching chamber 132, a launching bracket 133, a second driving mechanism 134, a second transmission mechanism 135, a first elastic mechanism 136, a guide rail 137, a first travel switch 138, a second travel switch 139, and a conductive piece 140.

The launching chamber 132 having a semi-cylindrical shape, placed within the second frame 131.

The launching bracket 133 passes through the launching chamber 132, and the launching bracket 133 is fixedly connected to the launching chamber 132.

The second driving mechanism 134 is configured to drive the second transmission mechanism 135. When the capturing device 11 has not yet been delivered to the first preset location, the second driving mechanism 134 drives the second transmission mechanism 135 so that the launching bracket 133 and the launching chamber 132 move downwards along the guide rail 137 to the second preset location and compress the first elastic mechanism 136. And when the capturing device 11 has been delivered to the first preset location, the second driving mechanism 134 continues to drive the second transmission mechanism 135 so that the first elastic mechanism 136 is released and the launching bracket 133 and the launching chamber 132 move upwards along the guide rail 137 under the action of the first elastic mechanism 136 and launch the capturing device 11.

The first travel switch 138 is configured to send a command to stop the transmission of the second transmission mechanism 135 when the launching bracket 133 and the launching chamber 132 have moved down to the second preset location so that the launching bracket 133 remains the stationary in the second preset location.

The second travel switch 139 is configured to electrically connect with the switch contact 127 to send a command to stop the advancing movement of the capturing device 11 when the capturing device 11 has been advanced to the first preset location, so that the capturing device 11 remains the stationary in the first preset location.

The conductive piece 140 is arranged on both sides of the second frame 131, and the conductive piece is electrically connected to the power contacts 126 to supply electrical energy.

Moreover, in an embodiment, the second driving mechanism 134 may be a stepper motor and it is connected to the power supply device of the onboard satellite (not shown in the figures).

The first elastic mechanism 136 may be a spring that passes through the launching bracket 133. The first elastic mechanism 136 is compressed during the downward movement of the launching bracket 133 and launching chamber 132. After the capturing device 11 advances the first preset location, the bottom of the first elastic mechanism 136 can abut against the top of the mounting bracket 122.

For the aforementioned embodiments, in some examples, the second transmission mechanism 135 includes a second transmission gear 1351 and a second transmission rack 1352 engaging with the second transmission gear 1351. And the second transmission gear 1351 is a semi-toothed structure. According to an embodiment of the disclosure, as shown in FIG. 8, the second transmission gear 1351 is connected to the second driving mechanism 134, and the second transmission rack 1352 is fixedly set on one side of the launching bracket 133. Therefore, when the capturing device 11 reaches the first preset location and aims at the defunct space target, the second driving mechanism 134 drives the second transmission mechanism 135 to deliver. And since the second transmission gear 1351 is the semi-toothed structure, the second transmission rack 1352 will be released during the transmission process, and then the launching bracket 133 and the launching chamber 132 move upwards under the elastic force of the first elastic mechanism 136, thereby pushing the capturing device 11 out of the launching device 13 to complete the launching action. The spring force of the first elastic mechanism 136 is 2000 N, which allows the capturing device 11 weighting 0.5 kilograms to fly at a speed of 20 m/s. Therefore, the capturing device 11 may penetrate and insert into the defunct space target at high speed, such as the honeycomb sandwich structure of a defunct spacecraft.

Figure 10:
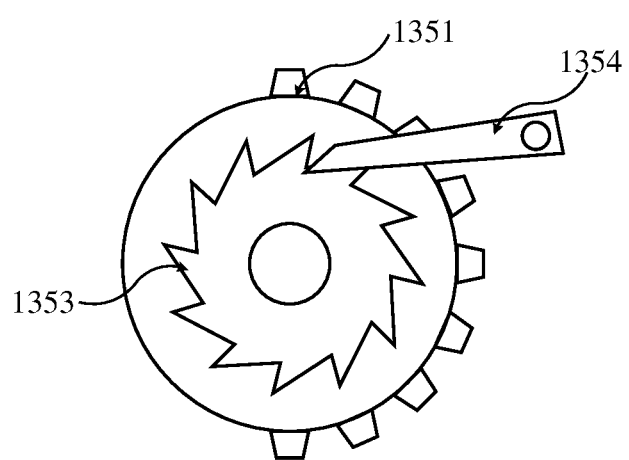
FIG. 10 is a diagram of the structure of a second transmission gear according to the disclosure.

For the aforementioned embodiments, in some examples, as shown in FIG. 10, the second transmission mechanism 135 also includes a ratchet 1353 and a pawl 1354. The ratchet 1353 is set inside the second transmission gear 1351, and the pawl 1354 is connected to the second driving mechanism 134. When the capturing device 11 has not been advanced to the first preset location, the power supply device on the satellite provides electrical energy to the second driving mechanism 134, which in turn drives the second driving gear 1351 to engage with the second transmission rack 1352 for transmission, whereby the launching bracket 133 and the launching chamber 132 are lowered to the second preset location and compress the first elastic mechanism 136, so that the first travel switch 138 is triggered. When the first travel switch 138 is triggered, the second driving mechanism 134 stops operating, at which time the pawl 1354 abuts against the outer peripheral wall of the ratchet 1353 to cause the transmission of the second transmission gear 1351 to stop driving and remain the stationary in the current transmission location. Eventually, the launching bracket 133 and the launching chamber 132 remain the stationary in the second preset location.

When the capturing device 11 advances to the first preset location and the capturing device 11 is ready to launch, the location unit 113 in the capturing device 11 can abut against the launching chamber 132. Therefore, under the action of elastic force of the first elastic mechanism 136, the capturing device 11 is launched into the target orbit.

Moreover, after the capturing device 11 located at the first preset location in the launching device 13 is launched, the delivery device 12 continues moving along the preset delivery trajectory. On the one hand, the mounting components corresponding to the launched capturing device 11 and other components, such as the mounting bracket 122 and the deceleration shaft 115, are delivered out of the launching device 13. On the other hand, the next capturing device 11 and its corresponding mounting components are delivered to the launching device 13 to execute a next capturing task.

Figure 11:
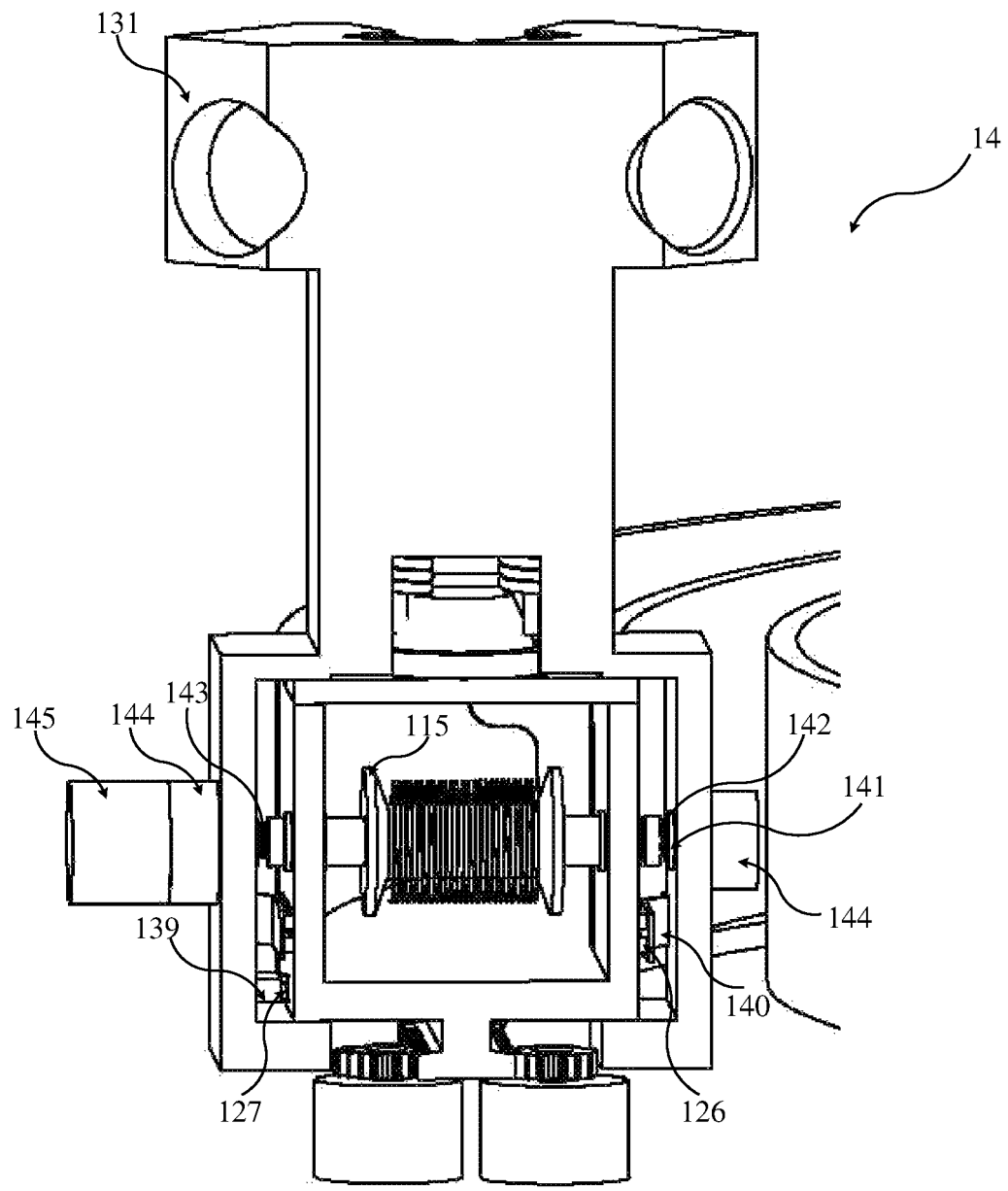
FIG. 11 is a diagram of the structure of a deceleration and recovery device according to the disclosure.
Figure 12:
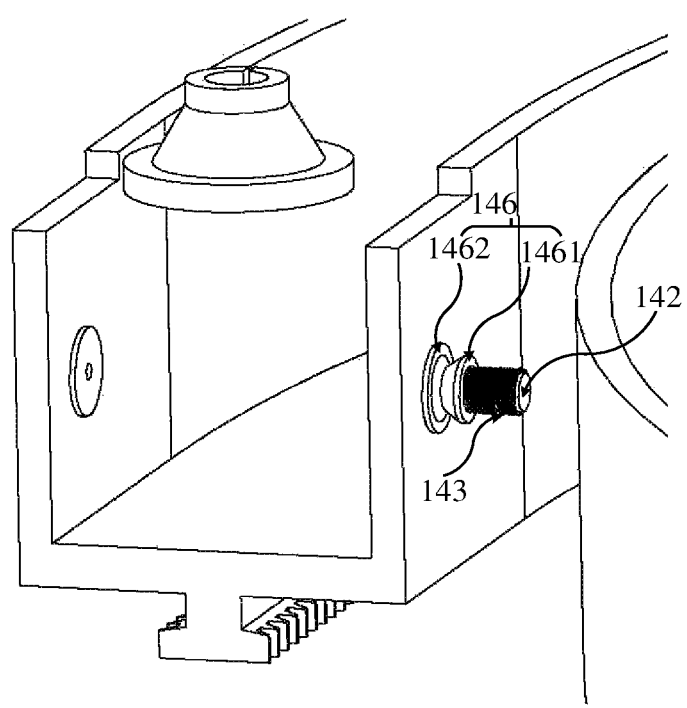
FIG. 12 is a diagram of a partial structure in the deceleration and recovery device according to the disclosure.

For the system 1 shown in FIG. 1, in some possible implementations, as shown in FIGS. 11 and 12, the deceleration and recovery device 14 includes an electromagnetic valve 141, a driving shaft 142, a second elastic mechanism 143 wound on the driving shaft 142, a magnetic damper 144, and a third driving mechanism 145.

The electromagnetic valve 141 is configured to stop working when the capturing device 11 is delivered to the first preset location, allowing the second elastic mechanism 143 to push the driving shaft 142 to connect with the deceleration shaft 115, and after the capturing device 11 is launched, the electromagnetic valve 141 attracts the driving shaft 142 to separate it from the deceleration shaft 115 after the capturing device 11 is launched. The driving shaft 142 is connected to the deceleration shaft 115 via a gear coupling 146.

The magnetic damper 144 is configured to generate damping force to damp the gradual unwinding process of the first rope 114 and the second rope 116 is unwounded, so as to decelerate the capturing device 11.

The third driving mechanism 145 is connected to the magnetic damper 144, and the third driving mechanism 145 is configured to pull the second rope 116 so that the deceleration shaft 115 rotate reversely, so as to recover the capturing device 11.

When the capturing device 11 advances to the first preset location and triggers the second travel switch 139, the capturing device 11 stops advancing, and the electromagnetic valve 141 also stops working. At this time, the second elastic mechanism 143 pushes the driving shaft 142 so that the driving shaft 142 connects with the deceleration shaft 115, and the damping torque is delivered between the driving shaft 142 and the deceleration shaft 115 through the gear coupling 146. It should be understood that after the capturing device 11 is launched, the first rope 114 gradually unwinds and fully detaches from the capturing device 11. When the first rope 114 continues to pull the second rope 116, since the second rope 116 is wound on the deceleration shaft 115, the deceleration shaft 115 rotates during the process of pulling the second rope 116. Additionally, the deceleration shaft 115 is connected to the driving shaft 142 through the gear coupling 146. Thus, when the magnetic damper 144 generates the damping force, its damping torque can be delivered to the deceleration shaft 115 via the driving shaft 142. Hence, the magnitude of the damping torque can be obtained by measuring the real-time angular velocity of the deceleration shaft 115, so as to decelerate flight speed of the capturing device 11 to zero before the second rope 116 is fully unwounded. When the capturing device 11 hits the defunct space target, the defunct space target is towed to the decay orbit by the onboard spacecraft equipped with the system 1. The heating device 117 on the deceleration shaft 115 can heat the second rope 116 to fuse the second rope 116 when the defunct space target has been towed to the predetermined decay orbit.

For the above embodiments, in some examples, the gear coupling 146 includes a conical friction gear 1461 and a driven helical gear 1462.

In the specific implementation process, the third driving mechanism 145 may be a stepper motor. Furthermore, the connection method of the third driving mechanism 145 and the magnetic damper 144 is not limited to the series connection shown in FIG. 10. And the connection method of the third driving mechanism 145 and the magnetic damper 144 may also be an integrated design.

Figure 13:
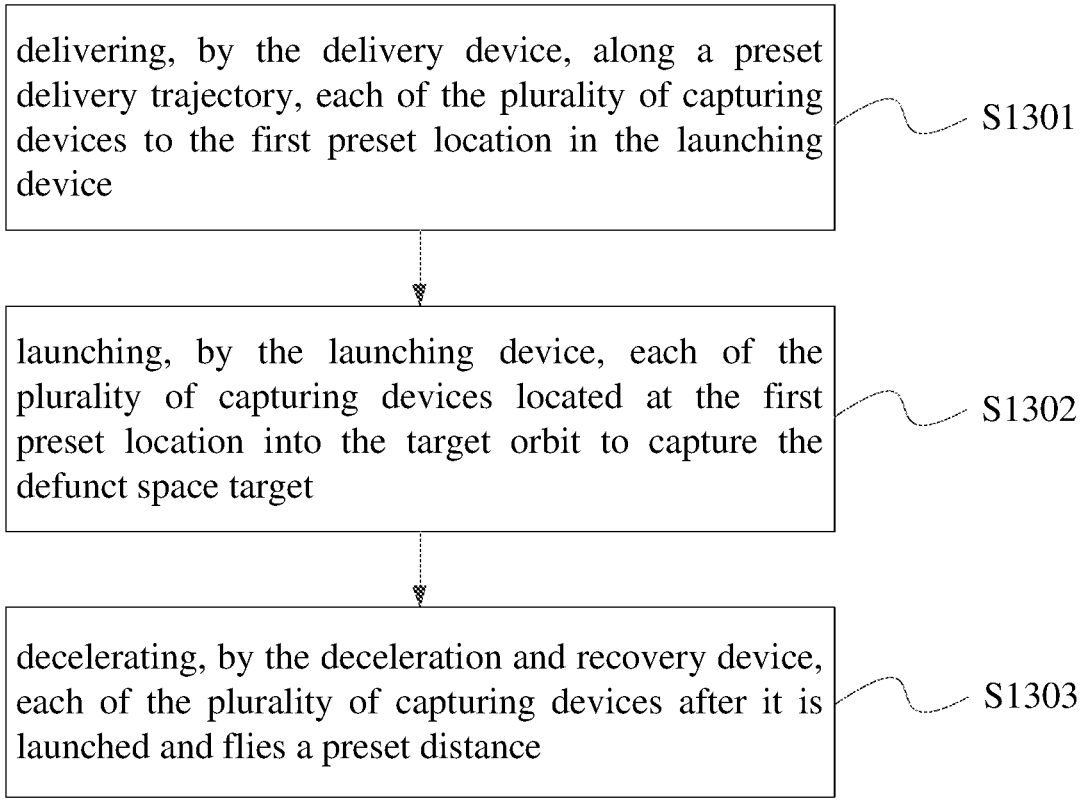
FIG. 13 is a schematic diagram of the process of a method for capturing the space target according to the disclosure.

FIG. 13 is a schematic diagram of the process of a method for capturing the space target according to the disclosure. The method may be applied in the system 1 described in the aforementioned technical scheme. The method according to the embodiment includes operations S1301 to S1303.

In the operation S1301, the delivery device delivers, along a preset delivery trajectory, each of the plurality of capturing devices to the first preset location in the launching device.

In the operation S1302, the launching device launches each of the plurality of capturing devices located at the first preset location into the target orbit to capture the defunct space target.

In the operation S1303, the deceleration and recovery device decelerates each of the plurality of capturing devices after it is launched and flies a preset distance.

Since the method illustrated in FIG. 13 may be applied to the system 1 described in the aforementioned technical scheme, the specific details of the method may refer to the detailed description of each component in the system 1 mentioned in the aforementioned technical scheme, which are not be elaborated here.

Exemplarily, for the method shown in FIG. 13, in some possible implementations, the method also includes the following step.

When the capturing device fails to hit the defunct space target, the capturing device may be recovered to the launching device.

The above description is only specific embodiments of the disclosure, but the protection scope of the disclosure is not limited to this. Any alterations or substitutions that can be readily thought of by any person skilled in the art within the technical scope disclosed by the disclosure should all be covered within the protection scope of the disclosure. Therefore, the protection scope of the disclosure should be based on the protection scope of the claims.

What is claimed is:

1. A system for capturing a space target, comprising a plurality of capturing devices, a delivery device, a launching device, and a deceleration and recovery device, wherein
   each of the plurality of capturing devices is configured to be launched into a target orbit to capture a defunct space target;
   the delivery device is configured to deliver, along a preset delivery trajectory, each of the plurality of capturing devices to a first preset location in the launching device;
   the launching device is configured to launch each of the plurality of capturing devices located at the first preset location into the target orbit to capture the defunct space target; and
   the deceleration and recovery device is configured to decelerate each of the plurality of capturing devices after the capturing device is launched and flies a preset distance,
   wherein the capturing device comprises a head, at least one barb unit, a location unit, a first rope wound inside of the capturing device, a deceleration shaft, and a second rope wound on the deceleration shaft, wherein the head is pointed for piercing and inserting into the defunct space target;
   the barb unit is configured to prevent the defunct space target from falling off when the defunct space target is towed;
   the location unit is configured to acquire real-time location of the capturing device to assist the capturing device in moving to the first preset location; and
   the second rope is connected to the first rope, and the second rope decelerates a flight speed of the capturing device to zero by gradually unwinding from the deceleration shaft when the first rope is fully unwounded,
   wherein the deceleration shaft further comprises a heating device, and the heating device is configured to heat the second rope to fuse the second rope when the defunct space target has been towed to a predetermined decay orbit.

2. The system according to claim 1, wherein
   the deceleration and recovery device is further configured to recover the capturing device into the launching device when the capturing device fails to hit the defunct space target.

3. The system according to claim 1, wherein the delivery device comprises a first frame, a plurality of mounting brackets, a plurality pairs of deceleration shaft holes, a first transmission gear, a first driving mechanism connected to the first transmission gear, a plurality of power contacts, and a plurality of switch contacts, wherein
   the plurality of mounting brackets are uniformly arranged on an upper side of the first frame, and each of the capturing devices is mounted on a corresponding one of the plurality of mounting brackets;
   the plurality pairs of deceleration shaft holes are uniformly formed in the first frame in a manner that each pair of deceleration shaft holes are arranged on two lateral sides of the first frame respectively, and the deceleration shaft is rotatably installed within the corresponding pair of deceleration shaft holes;
   a bottom of the first frame has an inverted T-shaped guide rail, and both transverse ends of the inverted T-shaped guide rail are respectively provided with a first transmission rack engaging with the first transmission gear;
   the first driving mechanism is configured to rotate the first transmission gear to translate the first transmission rack, so that the plurality of capturing devices move along the preset delivery trajectory;
   the plurality of power contacts are uniformly arranged on both sides of the first frame, and the plurality of power contacts provide electrical energy during the launching and deceleration recovery process of the capturing device; and
   the plurality of switch contacts are uniformly arranged on one side of the first frame.

4. The system according to claim 3, wherein the launching device comprises a second frame, a launching chamber, a launching bracket, a second driving mechanism, a second transmission mechanism, a first elastic mechanism, a guide rail, a first travel switch, a second travel switch, and a conductive piece;
   the launching chamber having a semi-cylindrical shape, and is placed within the second frame;
   the launching bracket passes through the launching chamber, and the launching bracket is fixedly connected to the launching chamber;
   the second driving mechanism is configured to drive the second transmission mechanism, wherein, when the capturing device has not yet been delivered to the first preset location, the second driving mechanism drives the second transmission mechanism so that the launching bracket and the launching chamber move downwards along the guide rail to the second preset location and compress the first elastic mechanism, and when the capturing device has been delivered to the first preset location, the second driving mechanism continues to drive the second transmission mechanism so that the first elastic mechanism is released and the launching bracket and the launching chamber move upwards along the guide rail under the action of the first elastic mechanism and launch the capturing device;

the first travel switch is configured to send a command to stop the transmission of the second transmission mechanism when the launching bracket and the launching chamber have moved down to the second preset location so that the launching bracket stops at the second preset location;

the second travel switch is configured to electrically connect with the switch contact point to send a command to stop the advancing movement of the capturing device when the capturing device has been advanced to the first preset location, so that the capturing device stops at the first preset location; and the conductive piece is arranged on two sides of the second frame, and the conductive piece is electrically connected to the power contacts to supply electrical energy.

5. The system according to claim 4, wherein the second transmission mechanism comprises a second transmission gear and a second transmission rack engaged with the second transmission gear, and the second transmission gear has a semi-toothed structure.

6. The system according to claim 4, wherein the second transmission mechanism comprises a ratchet and a pawl, the ratchet is arranged inside the second transmission gear, and the pawl is connected to the second driving mechanism.

7. The system according to claim 1, wherein the deceleration and recovery device comprises an electromagnetic valve, a driving shaft, a second elastic mechanism wound on the driving shaft, a magnetic damper, and a third driving mechanism, wherein the electromagnetic valve is configured to: stop working when the capturing device is delivered to the first preset location, allowing the second elastic mechanism to push the driving shaft to connect with the deceleration shaft, and attract the driving shaft to separate the driving shaft from the deceleration shaft after the capturing device is launched, wherein the driving shaft is connected to the deceleration shaft via a gear coupling;

the magnetic damper is configured to generate damping force to damp the gradual unwinding process of the first rope and the second rope is unwounded, so as to decelerate the capturing device; and the third driving mechanism is connected to the magnetic damper, and is configured to pull the second rope so that the deceleration shaft rotate reversely, so as to recover the capturing device.

8. A method for capturing a space target, the method being applied to a system for capturing a space target, the system comprising a plurality of capturing devices, a delivery device, a launching device, and a deceleration and recovery device, wherein the method comprises:

delivering, by the delivery device, along a preset delivery trajectory, each of the plurality of capturing devices to a first preset location in the launching device;

launching, by the launching device, each of the plurality of capturing devices located at the first preset location into a target orbit to capture a defunct space target; and decelerating, by the deceleration and recovery device, each of the plurality of capturing devices after the capturing device is launched and flies a preset distance, wherein the capturing device comprises a head, at least one barb unit, a location unit, a first rope wound inside of the capturing device, a deceleration shaft, and a second rope wound on the deceleration shaft, wherein the head is pointed for piercing and inserting into the defunct space target;

the barb unit is configured to prevent the defunct space target from falling off when the defunct space target is towed;

the location unit is configured to acquire real-time location of the capturing device to assist the capturing device in moving to the first preset location; and the second rope is connected to the first rope, and the second rope decelerates a flight speed of the capturing device to zero by gradually unwinding from the deceleration shaft when the first rope is fully unwounded, wherein the deceleration shaft further comprises a heating device, and the heating device is configured to heat the second rope to fuse the second rope when the defunct space target has been towed to a predetermined decay orbit.

9. The method according to claim 8, wherein the deceleration and recovery device is configured to recover the capturing device into the launching device when the capturing device fails to hit the defunct space target.

10. The method according to claim 8, wherein the delivery device comprises a first frame, a plurality of mounting brackets, a plurality pairs of deceleration shaft holes, a first transmission gear, a first driving mechanism connected to the first transmission gear, a plurality of power contacts, and a plurality of switch contacts, wherein the plurality of mounting brackets are uniformly arranged on an upper side of the first frame, and each of the capturing devices is mounted on a corresponding one of the plurality of mounting brackets;

the plurality pairs of deceleration shaft holes are uniformly formed in the first frame in a manner that each pair of deceleration shaft holes are arranged on two lateral sides of the first frame respectively, and the deceleration shaft is rotatably installed within the corresponding pair of deceleration shaft holes;

a bottom of the first frame has an inverted T-shaped guide rail, and both transverse ends of the inverted T-shaped guide rail are respectively provided with a first transmission rack engaging with the first transmission gear;

the first driving mechanism is configured to rotate the first transmission gear to translate the first transmission rack, so that the plurality of capturing devices move along the preset delivery trajectory;

the plurality of power contacts are uniformly arranged on both sides of the first frame, and the plurality of power contacts provide electrical energy during the launching and deceleration recovery process of the capturing device; and the plurality of switch contacts are uniformly arranged on one side of the first frame.

11. The method according to claim 10, wherein the launching device comprises a second frame, a launching chamber, a launching bracket, a second driving mechanism, a second transmission mechanism, a first elastic mechanism, a guide rail, a first travel switch, a second travel switch, and a conductive piece;

the launching chamber having a semi-cylindrical shape, and is placed within the second frame;

the launching bracket passes through the launching chamber, and the launching bracket is fixedly connected to the launching chamber;

the second driving mechanism is configured to drive the second transmission mechanism, wherein, when the capturing device has not yet been delivered to the first preset location, the second driving mechanism drives the second transmission mechanism so that the launching bracket and the launching chamber move downwards along the guide rail to the second preset location and compress the first elastic mechanism, and when the capturing device has been delivered to the first preset location, the second driving mechanism continues to drive the second transmission mechanism so that the first elastic mechanism is released and the launching bracket and the launching chamber move upwards along the guide rail under the action of the first elastic mechanism and launch the capturing device;

the first travel switch is configured to send a command to stop the transmission of the second transmission mechanism when the launching bracket and the launching chamber have moved down to the second preset location so that the launching bracket stops at the second preset location;

the second travel switch is configured to electrically connect with the switch contact point to send a command to stop the advancing movement of the capturing device when the capturing device has been advanced to the first preset location, so that the capturing device stops at the first preset location; and the conductive piece is arranged on two sides of the second frame, and the conductive piece is electrically connected to the power contacts to supply electrical energy.

12. The method according to claim 11, wherein
the second transmission mechanism comprises a second transmission gear and a second transmission rack engaged with the second transmission gear, and the second transmission gear has a semi-toothed structure.

13. The method according to claim 11, wherein
the second transmission mechanism comprises a ratchet and a pawl, the ratchet is arranged inside the second transmission gear, and the pawl is connected to the second driving mechanism.

14. The method according to claim 8, wherein the deceleration and recovery device comprises an electromagnetic valve, a driving shaft, a second elastic mechanism wound on the driving shaft, a magnetic damper, and a third driving mechanism, wherein the electromagnetic valve is configured to: stop working when the capturing device is delivered to the first preset location, allowing the second elastic mechanism to push the driving shaft to connect with the deceleration shaft, and attract the driving shaft to separate the driving shaft from the deceleration shaft after the capturing device is launched, wherein the driving shaft is connected to the deceleration shaft via a gear coupling;

the magnetic damper is configured to generate damping force to damp the gradual unwinding process of the first rope and the second rope is unwounded, so as to decelerate the capturing device; and the third driving mechanism is connected to the magnetic damper, and is configured to pull the second rope so that the deceleration shaft rotate reversely, so as to recover the capturing device.

\* \* \* \* \*